3,707,515
PROCESS FOR 11-CYANO-9,10-
ETHENOANTHRACENES
Charles Ferdinand Huebner, Chatham, N.J., assignor to
Ciba-Geigy Corporation
No Drawing. Filed July 2, 1970, Ser. No. 52,109
Int. Cl. C07c 12/64
U.S. Cl. 260—465 K        7 Claims

ABSTRACT OF THE DISCLOSURE

Process for the preparation of 11-cyano-9,10-ethenoanthracenes, e.g. those of the formula

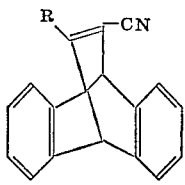

R=H, etherified or esterified OH, aliphatic, araliphatic or aromatic radical, by dehydrohalogenation of the corresponding 11-halo-11-cyano-9,10-ethanoanthracenes, intermediates in the synthesis of valuable antidepressants.

BACKGROUND OF THE INVENTION

Anti-depressants, such as 11-aminoalkyl-9,10-ethenoanthracenes, have been prepared by multi-step procedures according to conventional methods as described in Belgian and South African Patents, Nos. 730,929 and 2,234/69, respectively.

Surprisingly, a more efficient and less costly route to the above compounds has now been found which involves dehydrohalogenation of 11-halo-11-cyano-9,10-ethanoanthracenes to the corresponding 11-cyano-9,10-ethenoanthracenes.

SUMMARY OF THE INVENTION

The present invention concerns and has for its object the provision of a new process for the preparation of 11-cyano-9,10-ethenoanthracenes of the formula

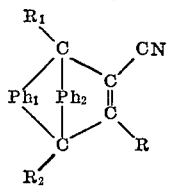    (I)

in which each of $Ph_1$ and $Ph_2$ is a 1,2-phenylene radical, R is hydrogen, etherified or esterified hydroxy, an aliphatic, araliphatic or aromatic radical and each of $R_1$ and $R_2$ is hydrogen, free, etherified or esterified hydroxy or an aliphatic radical, which comprises dehydrohalogenating a compound of the formula

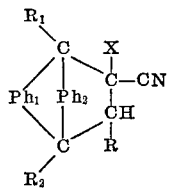    (II)

in which X is halo and $Ph_1$, $Ph_2$, R, $R_1$, and $R_2$ have the above meanings, with an alkali metal salt of an aliphatic carboxylic acid at elevated temperatures in an inert aprotic solvent. The resulting products are valuable intermediates in the manufacture of useful antidepressants, for example in the treatment or management of exogenous or endogenous depressions.

DESCRIPTION OF THE PREFERRED EMBODIMENTS

The process of the invention comprises the dehydrohalogenation of 11 - halo - 11 - cyano-9,10-ethanoanthracenes of the Formula II, wherein halo is for example bromo or chloro.

The 1,2-phenylene radicals $Ph_1$ and $Ph_2$ are unsubstituted or substituted in the remaining 4 positions by one or more than one, preferably one or two, of the same or different substituents, for example, lower alkyl, e.g. methyl, ethyl, n- or i-propyl or -butyl; free, etherified or esterified hydroxy or mercapto, such as lower alkoxy or alkylmercapto, e.g. methoxy, ethoxy, n- or i-propoxy or -butoxy, methylmercapto or ethylmercapto, lower alkanoyloxy, e.g. acetoxy; halo, e.g. fluoro, chloro or bromo; trifluoromethyl; nitro; amino, preferably di-lower alkylamino, e.g. dimethylamino or diethylamino, or acyl, such as lower alkanoyl or lower alkylsulfonyl, e.g. acetyl, propionyl, pivaloyl, methyl- or ethylsulfonyl. More particularly the radicals $Ph_1$ and $Ph_2$ represent $R_4$-1,2-phenylene, wherein $R_4$ is hydrogen, lower alkyl, hydroxy, lower alkoxy, halo, trifluoromethyl, nitro, amino or di-lower alkylamino. The term "lower," referred to above and hereinafter in connection with organic radicals or compounds respectively, defines such with up to 7, preferably up to 4, carbon atoms.

An aliphatic radical R, $R_1$ and $R_2$ is, for example, lower alkyl, e.g. that mentioned above, or lower alkenyl, e.g. vinyl or allyl, which radicals may contain functional groups, such as free, etherified or esterified hydroxy, prim., sec. or tert. amino and/or oxo, e.g. (hydroxy, lower alkoxy, amino, mono- or di-lower alkylamino and/or oxo)-lower alkyl, such as (hydroxy, methoxy, ethoxy or dimethylamino)-methyl, formyl, carboxy or carbo-lower alkoxy, 1- or 2-(hydroxy, methoxy, ethoxy, dimethylamino, carboxy or carbomethoxy)-ethyl or -propyl, or lower alkanoyl, e.g. acetyl or pivaloyl.

An araliphatic or aromatic radical R is, for example, $HPh_1$-lower alkyl, -alkanoyl or -hydroxyalkyl or $HPh_1$ respectively, e.g. benzyl, 1- or 2-phenethyl, benzoyl, phenylacetyl or α-hydroxybenzyl; phenyl, tolyl, anisyl, halophenyl, nitrophenyl, aminophenyl, acetylphenyl or benzoyl.

R preferably represents hydrogen, lower alkyl, hydroxylower alkyl, lower alkoxy-lower alkyl, prim., sec. or tert. amino-lower alkyl, carboxy, carbo-lower alkoxy, $R_4$-phenyl-lower alkyl or $R_4$-phenyl, in which amino and $R_4$ has been defined above. Each of $R_1$ and $R_2$ preferably represents hydrogen, lower alkoxy, lower alkyl, hydroxy-lower alkyl, trifluoromethyl, carboxy or carbo-lower alkoxy.

Particularly useful as starting materials in the process of the present invention are the compounds of Formula II, in which X is halo, each of $Ph_1$ and $Ph_2$ is $R_4$-1,2-phenylene, R is preferably hydrogen or lower alkyl, but also (hydroxy, amino, mono- or di-lower alkylamino or $R_4$-phenyl)-lower alkyl, carboxy, carbo-lower alkoxy or $R_4$-phenyl, each of $R_1$ and $R_2$ is preferably hydrogen, but also lower alkyl, hydroxy-lower alkyl, lower alkoxy, trifluoromethyl, carboxy or carbo-lower alkoxy and $R_4$ is preferably hydrogen, lower alkyl, hydroxy, lower alkoxy, halo, trifluoromethyl, nitro, amino or di-lower alkylamino.

Preferred starting materials of the invention are those of the formula

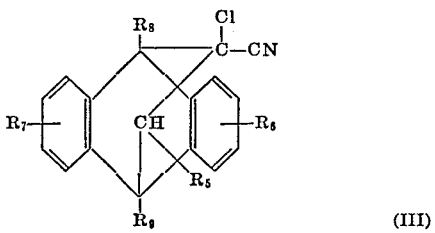

(III)

in which $R_5$ is hydrogen, methyl, hydroxymethyl, carboxy, carbomethoxy, carbethoxy, phenyl, tolyl, anisyl, chlorophenyl or nitrophenyl, each of $R_6$ and $R_7$ is hydrogen, chloro, methyl, methoxy or nitro and each of $R_8$ and $R_9$ is hydrogen, methyl, hydroxymethyl, methoxy, carboxy, carbomethoxy or carbethoxy.

Especially valuable starting materials are the compounds of Formula III, in which $R_5$ is hydrogen, hydroxymethyl or phenyl and each of $R_6$, $R_7$, $R_8$ and $R_9$ is hydrogen, or, above all, 11-chloro-11-cyano 9,10-ethanoanthracene.

Advantageously, the dehydrohalogenation is carried out at elevated temperatures, preferably between about 100–250°, or especially about 110–180° in the presence of an inert aprotic solvent. Such inert aprotic solvents are, for example, di-lower alkyl lower alkanoic acid, carbonic or phosphoric acid amides, such as dimethylacetamide, diethylacetamide, tetramethylurea, hexamethylphosphoramide or, above all, dimethylformamide. As dehydrohalogenating agents, there are used alkali metal salts of aliphatic carboxylic acids, for example, alkali metal lower alkanoates, such as, sodium, rubidium or cesium formate, propionate, butyrate or, above all, potassium acetate. More specifically, the process is carried out at reflux in dimethylformamide with potassium acetate as the dehydrohalogenating agent.

The starting materials are known, or if new, can be prepared according to methods known per se. For example, the starting materials of the Formula II are prepared by reacting a 9-$R_1$-10-$R_2$-anthracene with the compound

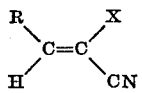

in accordance with the Diels-Alder reaction.

The products of the invention are used as intermediates in the preparation of valuable products, for example, those described in the above cited patents. Thus, for example, the compounds of Formula I can be hydrolyzed, more advantageously under mild alkaline conditions, e.g. with dilute alkali metal hydroxides, such as sodium or potassium hydroxide, and, if desired, in the presence of a peroxide, e.g. hydrogen peroxide, to yield the corresponding N-unsubstituted amides. These amides can be further converted into the corresponding N-mono- or N-di-alkylated amides by reacting them with reactive esters of lower alkanols, e.g. the halides, sulfates or sulfonates thereof, such as, ethyl or methyl iodide, bromide, chloride, sulfate or p-toluenesulfonate. The resulting amides can be reduced to the corresponding primary, secondary or especially the tertiary amines with complex di-light metal hydrides, e.g. an alkali metal aluminum hydride, such as lithium aluminum hydride. Thus, for example, from 11-cyano-9,10-ethenoanthracene of Formula I the corresponding 11-di-lower alkylaminomethyl-9,10-ethenoanthracenes are obtained.

The following examples are intended to illustrate the invention and are not to be construed as being limitations thereon. Temperatures are given in degrees centigrade, and all parts wherever given are parts by weight.

Example 1

The solution of 40 g. 11-chloro-11-cyano-9,10-ethanoanthracene, 80 g. potassium acetate and 200 ml. dimethylformamide is refluxed for 18 hours and then poured into water. The solids are filtered and dissolved in ethanol. The solution is treated with charcoal at reflux, filtered hot and the filtrate cooled to crystallize the product. Recrystallization from ethanol gives the 11-cyano-9,10-ethenoanthracene of the formula

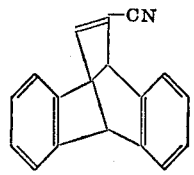

M.P. 194–6°.

The starting material is prepared as follows:

The mixture of 150 g. anthracene, 85 ml. 2-chloroacrylonitrile and 900 ml. xylene is refluxed for 5 days. The xylene is evaporated in vacuo and the resulting solids dissolved in chloroform. The chloroform solution is treated with charcoal, filtered and evaporated. Recrystallization of the resulting solids from ethanol gives 11-chloro-11-cyano-9,11-ethanoanthracene of the formula

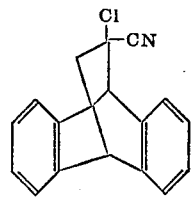

M.P. 138–43°.

Example 2

The solution of 10 g. 11-chloro-11-cyano-9,10-ethanoanthracene, 20 g. cesium acetate and 50 ml. dimethylformamide is refluxed for 18 hours and then poured into water. The solids formed are recrystallized from ethanol to afford the 11-cyano-9,10-ethenoanthracene as shown in Example 1.

Example 3

The mixture of 10 g. 11-cyano-9,10-ethenoanthracene, 12 ml. 30% aqueous hydrogen peroxide and 3 ml. 2% aqueous sodium hydroxide is refluxed for 1½ hours and then evaporated in vacuo. The residue is washed with water and recrystallized from methanol to afford the 11-carbamoyl-9,10-ethenoanthracene, M.P. 275°.

The solution of 6.5 g. thereof in 25 ml. dimethylformamide is added to the suspension of 2.66 g. 57% sodium hydride-mineral oil preparation in 150 ml. toluene. The mixture is heated to 100° for 2 hours. On cooling, the solution of 11.75 g. methyl p-toluenesulfonate in 10 ml. toluene is added to the above. The resulting mixture is refluxed for 6 hours. On cooling, 20 ml. water are added cautiously and the mixture evaporated. The residue is extracted with diethyl ether, the extract washed with water and evaporated. This residue is then recrystallized from methanol to yield the 11-dimethylcarbamoyl-9,10-ethenoanthracene melting at 133–4°.

To the suspension of 0.75 g. lithium aluminum hydride in 25 ml. diethyl ether, the solution of 3.8 g. 11-dimethylcarbamoyl-9,10-ethenoanthracene in 60 ml. tetrahydrofuran is added dropwise while stirring and the mixture is refluxed for 5 hours. After cooling, 5 ml. ethyl acetate are added dropwise, followed by 0.75 ml. water, 1.5 ml. 12% aqueous sodium hydroxide and 2.5 ml. water in this order. The inorganic salts are filtered off and the filtrate evaporated in vacuo. The residue is taken up in the minimum amount of ethanol and the solution acidified with ethanolic hydrochloric acid. The precipitate formed is filtered off, to yield the 11-dimethylaminomethyl-9,10-ethenoanthracene hydrochloride of the formula

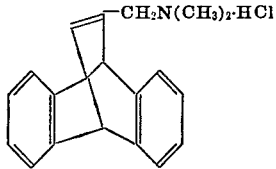

melting at 284–5° (dec.).

I claim:

1. The process for the preparation of 11-cyano-9,10-ethenoanthracenes of the formula

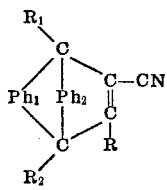

in which each of $Ph_1$ and $Ph_2$ is unsubstituted 1,2-phenylene or 1,2-phenylene substituted by one member of the group of lower alkyl, hydroxy, lower alkoxy, halo, trifluoromethyl, nitro, amino or di-lower alkylamino, and each of R, $R_1$ and $R_2$ is hydrogen or lower alkyl, which comprises dehydrohalogenating a compound of the formula

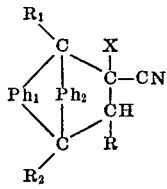

in which X is halo and $Ph_1$, $Ph_2$, R, $R_1$ and $R_2$ have the above meanings, with an alkali metal lower alkanoate at temperatures between about 100 and 250° and in an inert aprotic solvent.

2. Process as claimed in claim 1, in which the alkali metal lower alkanoate is a member selected from the group consisting of sodium, rubidium or cesium formate, propionate or butyrate.

3. Process as claimed in claim 1, wherein the solvent is selected from the group consisting of dimethylformamide, dimethylacetamide, diethylacetamide, hexamethylphosphoramide and tetramethylurea.

4. Process as claimed in claim 1, wherein the alkali metal lower alkanoate is potassium or cesium acetate.

5. Process as claimed in claim 1, wherein the 11-halo-11-cyano-9,10-ethanoanthracene used has the formula

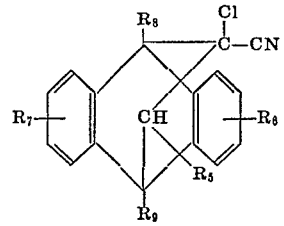

in which each of $R_5$, $R_8$ and $R_9$ is hydrogen or methyl, and each of $R_6$ and $R_7$ is hydrogen, chloro, methyl, methoxy or nitro.

6. Process as claimed in claim 1, in which the starting material used is 11-chloro-11-cyano-9,10-ethanoanthracene.

7. Process as claimed in claim 1, which comprises dehydrohalogenating 11 - chloro - 11 - cyano - 9,10 - ethanoanthracene with potassium acetate in dimethylformamide at reflux.

References Cited
UNITED STATES PATENTS
3,361,786   1/1968   Fink _____ 260—465.7

OTHER REFERENCES
Dietsche: Tetrahedron Letters, pp. 201–4, 1966.

LEWIS GOTTS, Primary Examiner

D. H. TORRENCE, Assistant Examiner

U.S. Cl. X.R.

260—465 D, 465 E, 465 F, 465 G, 558 R, 570.8 TC, 570.9, 999